United States Patent [19]

Kurihara et al.

[11] Patent Number: 4,818,978
[45] Date of Patent: Apr. 4, 1989

[54] POSITION AND IMAGE INPUTTING UNIT

[75] Inventors: Motoshi Kurihara, Tokyo; Tsukasa Matoba, Kawasaki, both of Japan

[73] Assignee: Kabushiki Kaisha Toshiba, Kawasaki, Japan

[21] Appl. No.: 748,470

[22] Filed: Jun. 25, 1985

[30] Foreign Application Priority Data

Jun. 26, 1984 [JP] Japan .................. 59-130102

[51] Int. Cl.⁴ ............................................. H04N 1/02
[52] U.S. Cl. .................................. 340/706; 340/710; 358/293; 358/294
[58] Field of Search ............. 340/710, 709, 706; 178/18, 19; 382/59, 20; 358/293, 294, 286, 256, 285, 295; 74/471 XY; 33/1 M; 250/221, 239

[56] References Cited

U.S. PATENT DOCUMENTS

| | | | |
|---|---|---|---|
| 3,182,291 | 5/1965 | Nassimbene | 382/89 |
| 3,541,248 | 11/1970 | Young | 358/294 |
| 3,987,685 | 10/1976 | Opocensky | 340/710 |
| 4,091,270 | 5/1978 | Musch et al. | 235/419 |
| 4,263,592 | 4/1981 | Takahashi et al. | 340/707 |
| 4,369,439 | 1/1983 | Broos | 340/710 |
| 4,385,464 | 9/1974 | Rider | 340/324 A |
| 4,390,873 | 6/1983 | Kirsch | 340/710 |
| 4,464,652 | 8/1984 | Lapson et al. | 340/710 |
| 4,523,235 | 6/1985 | Rajchman | 358/294 |
| 4,561,183 | 12/1985 | Shores | 340/710 |
| 4,581,761 | 4/1986 | Ichinokawa et al. | 382/59 |
| 4,623,787 | 11/1986 | Kim | 340/710 |
| 4,639,790 | 1/1987 | Kusaka | 353/294 |

FOREIGN PATENT DOCUMENTS

| | | |
|---|---|---|
| 0031502 | 7/1981 | European Pat. Off. . |
| 125157 | 10/1981 | Japan . |
| 0081631 | 5/1985 | Japan ........ 340/710 |

Primary Examiner—John W. Caldwell, Sr.
Assistant Examiner—Alvin Oberley
Attorney, Agent, or Firm—Foley & Lardner, Schwartz, Jeffery, Schwaab, Mack Blumenthal & Evans

[57] ABSTRACT

A position and image inputting unit in accordance with the present invention is a unit in which both the position inputting function and the image inputting function are incorporated in a packing case. The unit may be used for inputting the position data, as in a mouse in the prior art, when the user presses the packing case lightly. For inputting an image, the packing case is to be pressed harder, and the packing case is moved in the direction perpendicular to the scanning direction of the image scanner. To facilitate the motion, there is provided a guiding roller so that when the packing case is pressed hard, the case moves in a fixed direction only. Furthermore, in this state, through the operation of the image scanner, the image data is scanned and input in succession in the direction perpendicular to the direction of motion of the packing case.

11 Claims, 3 Drawing Sheets

FIG. 5

POSITION AND IMAGE INPUTTING UNIT

BACKGROUND OF THE INVENTION

1. Field of the Invention

The present invention relates to a position inputting unit to be used for a document editing apparatus such as a Japanese language word processor or a work station, in an image inputting function.

2. Description of the Prior Art

In a Japanese language word processor or a work station for office automation, use is being made of a keyboard, a pointing unit, an image inputting unit, or the like as the inputting unit. As a pointing unit there is available a tablet, a joy stick, a mouse, or others. Of these, a mouse has recently been attracting special attention for such reasons as its low cost and the simplicity in which the switching operation can be made for keeping the mouse from the work on the keyboard. In addition, a facsimile is being used as the image inputting unit. However, a contact sensor has been developed in recent years for inputting the picture. Here, instead of inputting the image by inserting a piece of paper as is done for facsimile, there is being proposed a method of inputting the image by manually moving the contact sensor. In such an image inputting unit with a contact sensor, it is possible to input the image of a portion of a piece of paper even when one side of the paper is bound like in the case of a book. This makes it possible to input an arbitrary image less expensively than by the facsimile.

Currently, in preparing a document at the work station or the like, there are cases in which both sentences and figures appear in the document. Accordingly, when image data is desired to be input in the prior art document editing apparatus, the position for inputting the figure is designated first by the mouse, and then the image data is input to the contact sensor or the like to be input in the designated area. Because of this, both of a position inputting unit such as a mouse and an image inputting unit such as a contact sensor are connected at the work station as separate input terminal equipment. Therefore, in editing a document, a user has to alternatively operate the mouse and the contact sensor by hand. In addition to the troublesome nature of the operation and a lowering of the working efficiency, this decreases the available working space as the two separate units are placed on the work station desk.

SUMMARY OF THE INVENTION

An object of the present invention is to provide a position and image inputting unit which makes it possible to improve markedly the efficiency of editing a document that includes pictures.

Another object of the present invention is to provide a position and image inputting unit which makes it possible to use the distance measurer for the image inputting mechanism and the position inputting mechanism in common.

A feature of the present invention is that a position inputting unit includes a packing case, a rolling ball that is fixed to the packing case via an elastic body, a position detector which detects the position data based on the rolled distance of the rolling ball, a guiding roller which, when the elastic body fixed to the packing case is in the compressed state, regulates the direction of rolling of the rolling ball and makes it possible to move the packing case in a fixed direction, and an image scanner which reads the image when the elastic body fixed to the packing case is in a compressed state, and inputting of the image is carried out by bringing the elastic body to the compressed state by pressing hard on the packing case, to scan the image data in succession in the direction perpendicular to the direction of the motion of the packing case, by the action of the image scanner.

BRIEF DESCRIPTION OF THE DRAWING

These and other objects, features and advantages of the present invention will be more apparent from the following description of a preferred embodiment, taken in conjunction with the accompanying drawings, in which.

DESCRIPTION OF THE PREFERRED EMBODIMENT

Figure 1:
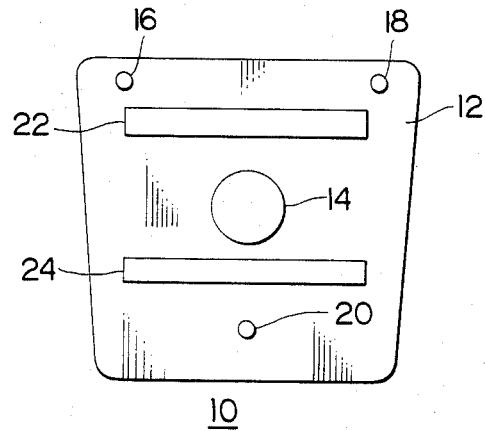
FIG. 1 is the bottom view of a position and image inputting unit embodying the present invention.
Figure 2:
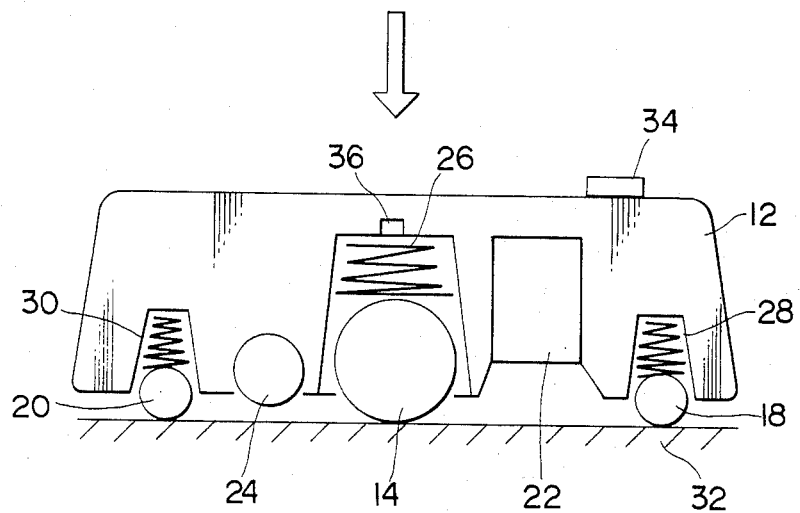
FIG. 2 is a simplified cross-sectional view of the position and image inputting unit as shown in FIG. 1.

Referring to FIG. 1, a position and image inputting unit embodying the present invention is shown with a reference numeral 10. The position and image inputting unit 10 has a rolling ball 14 in the packing case 12, and includes further auxiliary balls 16, 18, and 20 for supporting the rolling ball 14, to add the image inputting function, an image scanner 22 for inputting the image data, and a guiding roller 24 for regulating the direction of the packing case in order to keep the packing case 12 moving in a fixed direction at all times during the operation of the image scanner 22. FIG. 2 is a simplified cross-sectional view of the position and image inputting unit 10 which illustrates the locations of the various components described in the above and the height relationships of the various components with respect to the desk surface 32. As seen from FIG. 2, the rolling ball 14 and the auxiliary balls 18 and 20 are fixed to the packing case 12 via freely expandable springs 26, 28, and 30, respectively. (It should be noted, though not shown in the figure, the auxiliary ball 16 is also fixed to the packing case 12 via a spring.) Normally, the position and image inputting unit 10 has the rolling ball 14 and the auxiliary balls 16, 18, and 20 in contact with the desk surface 32. Accordingly, as long as the user presses the position and image inputting unit lightly to the desk surface 32, it moves on the desk surface 32 due to rolling of only the rolling ball 14 and the auxiliary balls 16, 18, and 20 that make contact with the desk surface 32. When the user turns on a switch 34 at a desired position, it becomes possible to input the position data (the operation of the position input function will be described later). Next, for inputting the image, the user presses the position and image inputting unit hard toward the desk surface 32 (pressed in the direction of the arrow in FIG. 2). Then, the spring 26, 28, and 30 are compressed to let the rolling ball 14 and the auxiliary balls 16, 18, and 20 enter toward the inside of the packing case 12. Because of this, the guiding roller 24 touches the desk surface 32 together with the rolling ball 14 and the auxiliary balls 16, 18, and 20. The guiding roller 24 has a cylindrical form, with its long axis parallel to the scanning direction of the image scanner 22, as shown by FIG. 1. Therefore, when the position input unit is pressed hard, the direction of motion of the unit is regulated only to the direction which is perpendicular to the direction of the long axis of the guiding roller 24 (that is, the scanning direction of the image scanner 22). At the same time, by pressing hard on the packing case 12, a switch 36 is turned on due to compression of the spring 26, which actuates the image scanner 22. In this manner, the image is scanned in succession one line at a time in the direction perpendicular to the direction of motion of the packing case 12, accomplishing inputting of the image which is on the desk surface 32. In the present embodiment, when the springs 26, 28, and 30 are in normal state, the guiding roller 24 is arranged to be fixed to the packing case 12 with separation of a fixed height from the common contact line with the rolling ball 24 and the auxiliary balls 16, 18, and 20, namely, the desk surface 32, so that the user can select the position inputting function or the image inputting function in accordance with the distribution of his force that is exerted on the packing case 12. The operation of the unit as an image inputting unit will also be described later.

Figure 3:
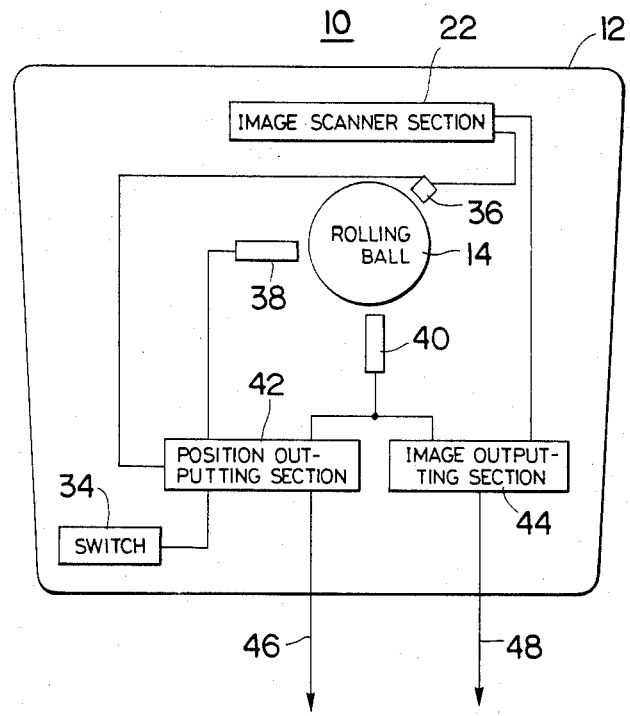
FIG. 3 is a simplified circuit diagram of the position and image inputting unit as shown in FIG. 1.

Referring to FIG. 3 the circuit construction of the position and image inputting unit 10 embodying the present invention is illustrated.

The circuit construction of the position and image inputting unit 10 includes rotary encoders 38 and 40 which measure the rolled distance in the X and Y directions, respectively, of the rolling ball 14 that rolls on the desk surface 32, a position outputting section 42 which outputs the total displacement of the unit 10 computed based on the pulse numbers input from the rotary encoders 38 and 40, and an image outputting section 44 which outputs the image data that corresponds to the pulse signals from the rotary encoder 40 for the Y direction by receiving an image data from the image scanner 22 and the pulse signals from the rotary encoder 40. The position output section 42 is arranged to interrupt its operation by the signal for turning the switch 36 on, due to pressure applied to the packing case 12.

Next, the operation of the embodiment will be described by referring to FIG. 3. When the position and image inputting unit is used as a position inputting unit, that is, when the packing case is moved while pressed lightly, the rolling ball 14 rolls on the desk surface, similar to an ordinary mouse, and the rolled distance in the X and Y direction are measured by the rotary encoders (distance measurers) 38 and 40 for the X and Y directions, respectively, the results of the measurements being input to the position outputting section 42. Here, as the rolling ball rolls, every time the surface of the ball crosses the rotary encoder by a fixed distance, each rotary encoder generates a pulse. The position outputting section 42 computes the total amount of shift base on the number of pulses that it receives from the rotary encoders 38 and 40 for the X and Y directions, respectively. If the user turns on the switch 34, the position outputting section 42 outputs the position data (position coordinates) of the total amount of shift through a signal line 46. For example, if the user shifts the position inputting unit on the desk surface while watching the display which is not shown in the figure, a cursor moves according to the shift, and when the switch 34 is turned on at a desired position, the position coordinates for that time are arranged to be output.

Next, when the position and image inputting unit is used as an image inputting unit, i.e., the user presses hard on the packing case the supporting spring 26 of the rolling ball 14 is compressed (of course, the auxiliary balls 16, 18, and 20, too, are compressed). By this action the image switch 36 is turned on and the image scanner section 22 is actuated. In this way, the image data for one line is input from the image scanner section 22 and is transferred to the image outputting section 44. Also, the image outputting section 44 the pulse signal from the rotary encoder 40 for the Y direction. Corresponding to the input pulse signal, the image inputting section 44 outputs the image data through the signal line 48. The scanning direction of the image scanner 22 is perpendicular to the direction of distance measurement of the rotary encoder 40 (the direction of motion of the packing case 22 is regulated to be perpendicular to the scanning direction due to the presence of the guiding roller 24), so that for every shift for a fixed distance of the image scanner 22, the image data input in the unit of one line will be output through the signal line 38. (Actually, with an input of the image data at an interval of eight scans per millimeter, for example, eight pulse signals are output from the rotary encoder 40 during a shift of one millimeter of the rolling ball 14. Therefore, the timing of the image data output from the image outputting section 44 is one line corresponding to one pulse signal.) As shown in FIG. 3, the operation of the position outputting section 42 is interrupted by means of the signal for turning on the switch 36 induced by pressing hard on the packing case 12, whereby the unit will be made to function only as an image inputting unit. Moreover, the position outputting section 42, the image outputting section 44, and the switch 34 may be placed on the outside of the packing case 12, and also it may be arranged to have the image data and the measured distance alone output from the packing case 12.

Next, the image scanner 22 will be described by referring to FIGS. 4 and 5.

Figure 4:
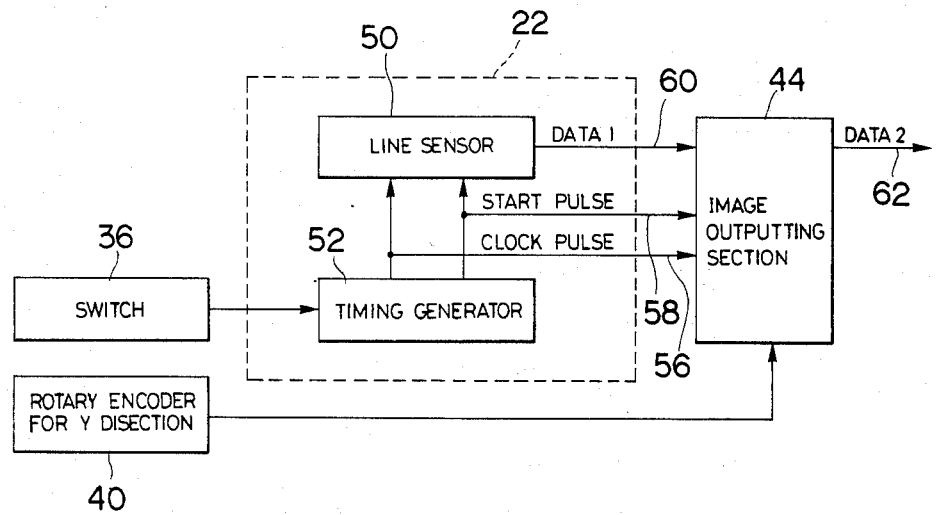
FIG. 4 is a concrete circuit diagram of the position and image inputting unit as shown in FIG. 1.
Figure 5A:
FIGS. 5a–f are time charts showing operation of the circuit as shown in FIG. 4.
Figure 5B:
Figure 5C:
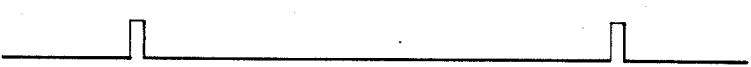

As shown by FIG. 4, the image scanner section 22 includes a line sensor 50 and a timing generator 52. The timing generator 52 is actuated by the signal of the image switch 36 as shown in FIG. 5a to generate a clock pulse and a start pulse as shown by FIGS. 5b and 5c, respectively. These pulses are transmitted to the line sensor 50 and the image outputting section 44 through a clock pulse line 56 and a start pulse line 58.

Figure 5D:
Figure 5E:
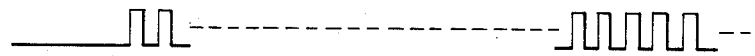
Figure 5F:
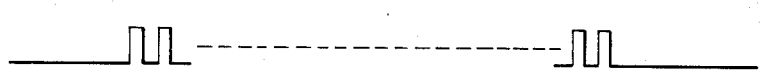

The line sensor 50 is actuated by the start pulse, and by a pulse which is input thereafter, one line of image data detected by the line sensor 50 as shown by FIG. 5e is transmitted to the image outputting section 44 as a series, for each clock, via a data 1 line 60. The start pulses are generated at a rate of one pulse per clock numbers that are necessary for scanning one line of the line sensor 50. The detected image data output from the line sensor 50 is transmitted in succession through the data 1 line 60, in which the pulse that indicates the starting position of one line is the start pulse therefore, the image outputting section receives first a rotary encoder pulse as shown by FIG. 5d, and then at the first start pulse that is input thereafter, outputs the image data that is transferred from the line sensor 50 to the outside through a data 2 line 62. Here, the data that is output to the outside lasts until the next start pulse appears. In other words, the data between the first start pulse and the second start pulse subsequent to the generation of a rotary encoder pulse, is output to the outside as one line of image data, as shown in FIG. 5f.

It should be noted that the present invention is not limited to the embodiment described in the foregoing. Thus, for example, the switch for inputting the image may be installed at the top of the position inputting unit, and the user controls the turning on and off the switch. Or, a mechanism may be introduced which regulates the direction of rolling of the rolling ball 14 during the inputting of the image to a fixed direction only. Furthermore, an optical mouse may be used for the position inputting unit. Here, what is meant by an optical mouse is a mouse whose distance of displacement is computed by means of a mechanism which detects the numbers of crossing in the X and Y directions of the lattice points, by introducing beforehand a lattice-like pattern on the desk surface. Needless to say, the present invention includes a case in which such an optical mouse is utilized as the position inputting unit.

Various modifications will become possible for those skilled in the art after receiving the teaching of the present disclosure without departing from the scope thereof.

What is claimed is:

1. A position and image inputting unit which has a position inputting function and a function to input image information to be detected from the surface of an object, comprising:
   a packing case,
   position outputting means including X and Y position encoders installed in said packing case for obtaining two-dimensional position data of said packing case as said packing case moves along the surface of the object;
   image reading means installed in said packing case for reading the image information;
   switching means, mounted in said packing case, for switching the operation of the position and image inputting units between said position outputting means and said image reading respectively for selectively outputting data only from said position outputting means to a device external to said packing case or outputting image information to said external device;
   wherein said position outputting means includes a rolling ball which makes contact with the surface of the object, and outputs position data for said packing case based on the rolling distance of the rolling ball;
   wherein said position and image inputting unit further comprises guide means for regulating the direction of rolling of the rolling ball to make it possible to move said packing case in a fixed direction when said image reading means is in operation; and
   wherein said switching means comprises an elastic part which is disposed between said rolling ball and said packing case, and a first switch which outputs a signal, when the elastic part is compressed by a predetermined amount of displacement, that actuates said image reading means as well as interrupts the operation of said position outputting means that has been in operation.

2. A position and image inputting unit as claimed in claim 1, in which said guiding means comprises a guiding roller arranged in said packing case which, when the elastic part is compressed by a predetermined amount of displacement, is in contact with the surface of the object for moving said packing case in a fixed direction.

3. A position and image inputting unit as claimed in claim 1, wherein said position encoders comprise rotary encoders for measuring the rolled distances in the X and Y directions of the rolling ball which rolls on the surface of the object, a position output section for computing the total amount of displacement of said packing case from the numbers of pulses output by the rotary encoders, and a second switch for outputting the total amount of displacement of said packing case computed at the position output section.

4. A position and image inputting unit as claimed in claim 3, in which said image reading means comprises an image scanner for reading the image information, and an image outputting section for receiving the image data from the image scanner and a pulse signal from the rotary encoder in the Y direction and for outputting the image data corresponding to the pulse signal.

5. A position and image inputting unit as claimed in claim 4, in which the first switch is arranged, when the elastic part is compressed by a predetermined amount of displacement, to be turned on to start the operations of the image scanner and the image output section as well as to interrupt the operation of the position outputting section.

6. A position and image inputting unit as claimed in claim 1, wherein said position encoders comprise rotary encoders for measuring the rolled distances in the X and Y direction of the rolling ball which rolls on the surface of the object, a position outputting section for computing the total amount of displacement of said packing case from the numbers of pulses outputted by the rotary encoders, and a second switch for outputting the total amount of displacement of said packing case computed at the position output section.

7. A position and image inputting unit which has a position inputting function and a function to input image information to be detected from the surface of an object comprising:
   a packing case;
   position outputting means comprising X and Y position encoders installed in said packing case which includes a rolling ball that makes contact with the surface of the object to be detected, for outputting to a device external to said packing case two-dimensional position data of said packing case based on the rolled distance of the rolling ball as said packing case moves along the surface of the object;
   an elastic part which is inserted between said rolling ball and said packing case;
   an image scanner for reading the image information;
   an image outputting section which receives the image information from the image scanner for outputting to said external device image data that corresponds to the position of the scanner;
   a guiding roller arranged in said packing case which, when the elastic part is compressed by a predetermined amount of displacement, is in contact with the surface of the object in order to make said packing case movable in a fixed direction; and
   a first switch which outputs, when the elastic part is first compressed by a predetermined amount of displacement, a first signal that causes the image outputting section to start operation, and a second signal to interrupt the operation of the position outputting means that has been in operation when the elastic part is again compressed by the predetermined amount of displacement.

8. A position and image inputting unit which has a position inputting function and a function to input image information to be detected from the surface of an object, comprising:
   a packing case,
   position outputting means including X and Y position encoders installed in said packing case for obtaining two-dimensional position data of said packing case as said packing case moves along the surface of the object;
   image reading means installed in said packing case for reading the image information;
   switching means, mounted in said packing case, for switching the operation of the position and image inputting units between said position outputting means and said image reading respectively for selectively outputting data only from said position outputting means to a device external to said packing case or outputting image information to said external device;
   wherein said position outputting means includes a rolling ball which makes contact with the surface of the object, and outputs position data for said packing case based on the rolling distance of the rolling ball;
   wherein said position and image inputting unit further comprises guide means for regulating the direction of rolling of the rolling ball to make it possible to move said packing case in a fixed direction when said image reading means is in operation; and
   wherein said switching means comprises an elastic part which is inserted between said rolling ball and said packing case, and a first switch which outputs a signal, that actuates said image reading means when the elastic part is compressed by a predetermined amount of displacement.

9. A position and image inputting unit for sensing a position and images on a surface, comprising:
   (a) a unit casing;
   (b) a position inputting unit with a rolling ball elastically supported within said unit casing and X and Y position detecting means for measuring two-dimensional rolled distances of the rolling ball along the surface and outputting data indicative of said rolled distances to a device external to said unit casing;
   (c) auxiliary balls for elastically supporting said unit casing on the surface so that said rolling ball is in contact with the surface;
   (d) an image scanner supported within said unit casing for generating image data from the images on the surface and outputting said image data to said external device;
   (e) a guide roller supported within said unit casing for allowing said unit casing to move in a fixed direction when the images are scanned;
   (f) a first position switch for activating said position inputting means, and
   (g) a second image switch communicating with said elastically supported rolling ball for activating said image scanner in cooperation with said guide roller when said unit casing is pressed towards and moved on the surface so that said second image switch is turned on by said rolling ball.

10. The position and image inputting unit as set forth in claim 9, wherein said position inputting unit comprises:
    (a) two rotary encoders positioned perpendicular to one another for generating pulses indicative of a rolled distance of said rolling ball in X and Y directions, respectively; and
    (b) a position outputting unit for computing the rolled distance in each of the X and Y directions on the basis of the number of pulses outputted from said rotary encoders.

11. The position and image inputting unit as set forth in claim 10, wherein said image scanner comprises:
    (a) an image scanner section having a timing generator, activated when said second image switch is activated, for generating a clock pulse and a start pulse, and a line sensor, activated in response to the start pulse, for generating a series of image data corresponding to a line of images on the surface in response to the clock pulse; and
    (b) an image outputting section for outputting image data for each line of images on the surface in response to a pulse generated from one of said rotary encoders, wherein the one of said rotary encoders is disposed so that is measures a distance perpendicular to the scanning direction during a duration defined by the time between the two successive start pulses.

* * * * *